July 30, 1940.   C. D. YOUNG   2,209,910
PRESSURE MEASURING OR INDICATING INSTRUMENT
Filed April 21, 1938    2 Sheets-Sheet 1

INVENTOR
Claude D. Young
BY
Blair, Curtis, Dunne & Hayward
ATTORNEYS

July 30, 1940.  C. D. YOUNG  2,209,910
PRESSURE MEASURING OR INDICATING INSTRUMENT
Filed April 21, 1938  2 Sheets-Sheet 2
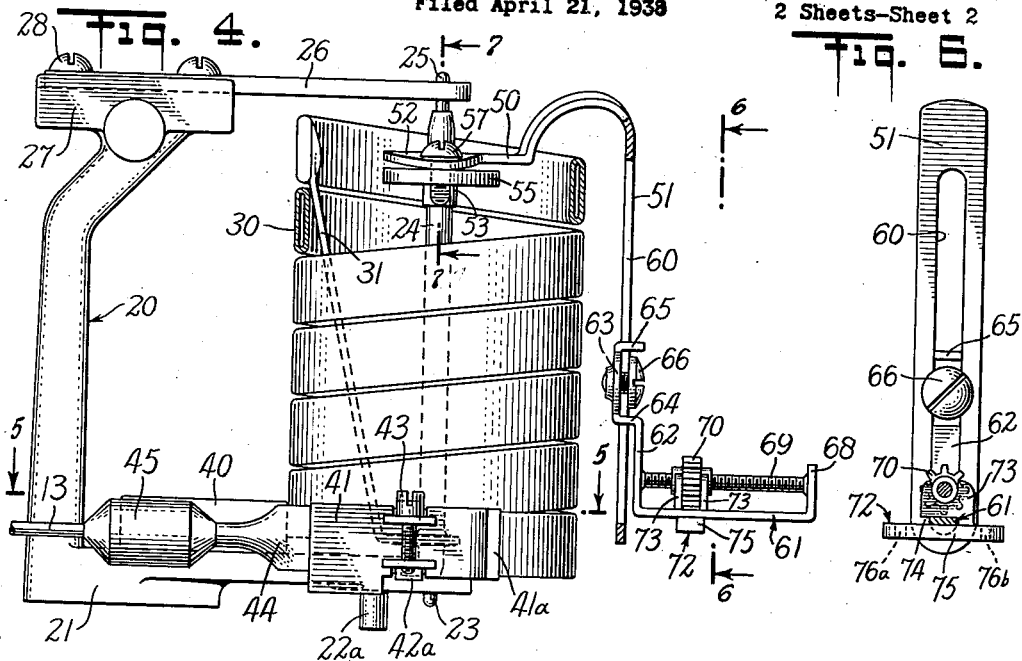
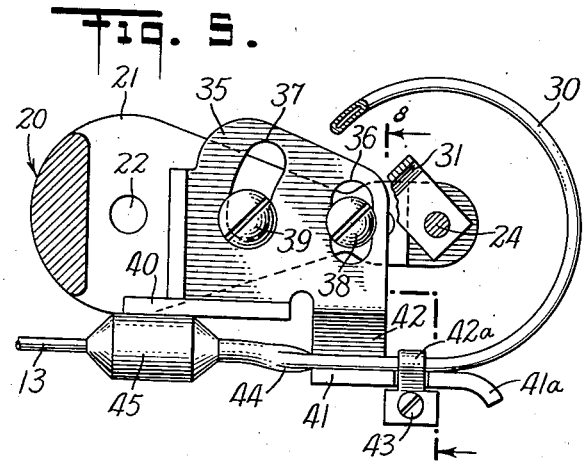
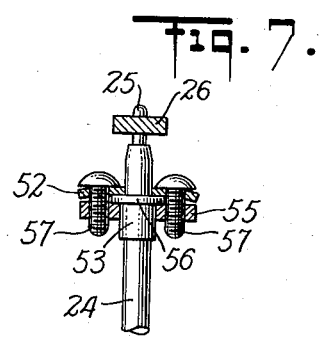
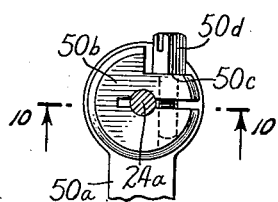
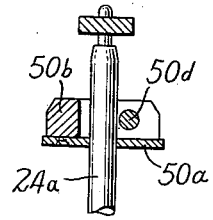
INVENTOR
Claude D. Young
BY
Blair, Curtis, Dunne & Hayward
ATTORNEYS Patented July 30, 1940

2,209,910

UNITED STATES PATENT OFFICE 2,209,910

PRESSURE MEASURING OR INDICATING INSTRUMENT

Claude D. Young, Foxboro, Mass., assignor to The Foxboro Company, Foxboro, Mass., a corporation of Massachusetts Application April 21, 1938, Serial No. 203,302

5 Claims. (Cl. 73—109)

The invention herein described pertains to improvements in instruments for indicating, recording and/or controlling variable conditions.

In the embodiments chosen to illustrate said invention several pressure responsive elements are provided in a single instrument casing for recording on a single chart the values being measured by several temperature responsive elements, such as thermometer bulbs filled with mercury or other fluid which varies in a characteristic with change of temperature. The thermometer bulb is located at a place whose temperature is to be measured and is connected by a small bore or capillary tubing with a spiral tube or other flexible element one end of which is free to move in response to pressure variations in the tubing caused by changes of temperature in the bulb. This pressure-responsive element is adjustably mounted in the casing and its free end is connected through suitable linkage mechanism with a pen moving over the chart on which the record is recorded. Usually the bulb, tubing and element are filled and sealed with what ever fluid is used and calibrated as a responsive unit.

It is an object of the present invention to provide adjustable connections between each pressure responsive element and its support and adjustable connections between each pressure responsive element and its respective pen so that a number of such elements may be mounted in an instrument casing and their linkage connections with their respective pens subsequently adjusted to pass over one another without interference.

Other objects will be in part obvious and in part pointed out hereinafter.

In the drawings wherein are illustrated several embodiments of the invention:

Figure 4 is an elevation, partly in section, of a standardized measuring element assembly in accordance with the present invention;

Figure 5 is a section along lines 5—5 of Figure 4;

Figure 6 is a section along lines 6—6 of Figure 4;

Figure 7 is a section along lines 7—7 of Figure 4;

Figure 8 is a section along lines 8—8 of Figure 5; and

Figures 9 and 10 are details of a modified form of connection between the lever and the arbor of the element assembly. (Figure 10 is a section taken on line 10—10 of Figure 9.)

Figure 1:
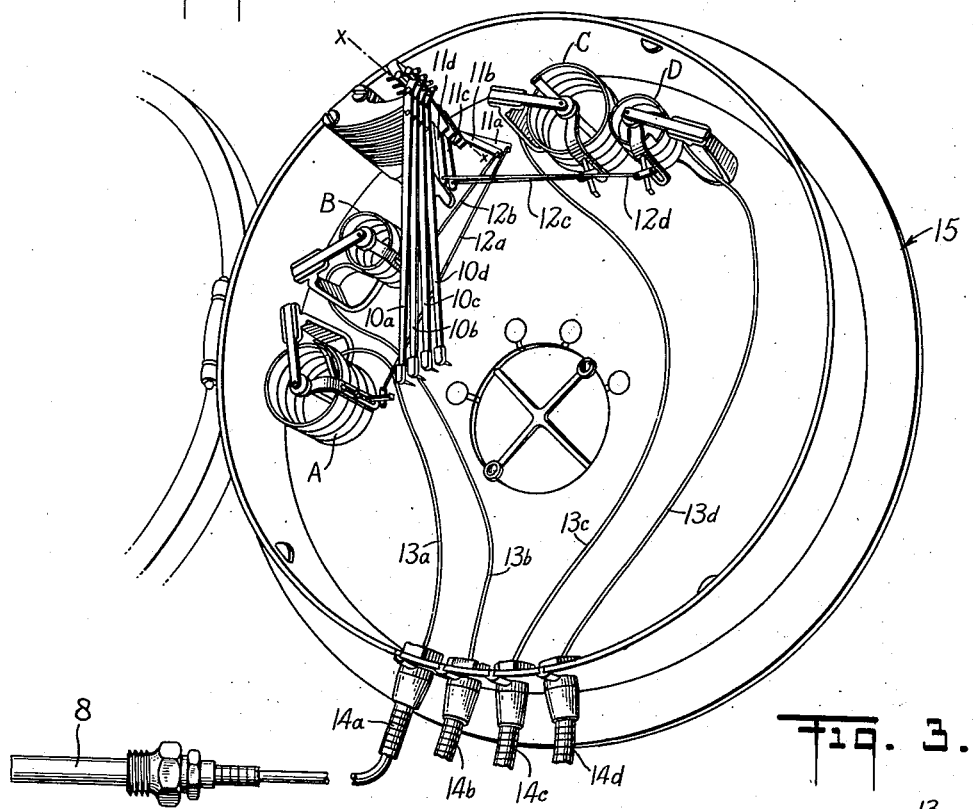
Figure 1 is a perspective view of a multiple pen recorder chosen to represent a physical embodiment of the invention and illustrating a standardized instrument case connected for surface mounting, with which are incorporated standardized measuring elements of the present invention.
Figure 3:
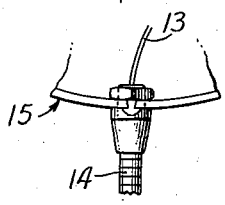
Figure 3 is a detail illustrating the preferred mode of connecting the measuring unit with the instrument case.
Figure 2:
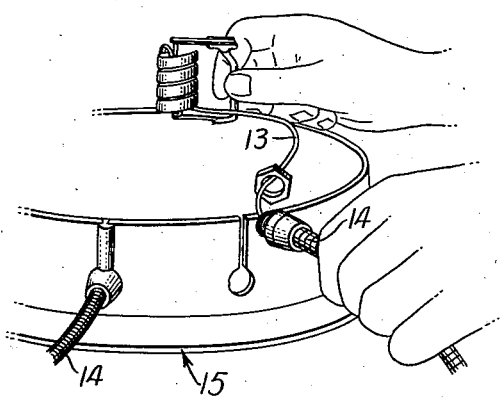
Figure 2 is a part perspective view illustrating the manner in which a measuring unit or responsive unit may be bodily removed from or assembled with the instrument case.

Referring to the drawings wherein like reference characters designate like parts throughout the several views, there is illustrated in Figure 1 a recording thermometer of the four-pen type, in which recording pens 10a, 10b, 10c and 10d are suitably mounted for movement about a common axis XX of rotation by a mounting assembly as described in United States patent to E. H. Bristol et al., No. 1,778,702, dated October 14, 1930. The pen arm levers 11a, 11b, 11c and 11d, of known construction, move the pen arms and are connected by links 12a, 12b, 12c and 12d with the levers of the measuring element assemblies generally designated A, B, C and D to be described. The helical tubes constituting the pressure springs of said element assemblies are suitably connected at one end by capillaries 13a, 13b, 13c and 13d with corresponding thermometer bulbs 8. The protective tubing 14a, 14b, 14c and 14d protect portions of the capillaries extending outside the casing 15. The measuring element, the capillary tubing and protective tubing and the responsive element together form a unit which hereinafter will be referred to as the responsive unit.

While a four-pen recorder is illustrated in Figure 1 it will be understood that such is by way of example only and that the number of pens and associated measuring units may be decreased or increased as desired.

In instruments of the character described above the distances of the several pen arm levers 11a, 11b, 11c and 11d from the back of the casing are all different and so their connecting links 12a, 12b, 12c and 12d are preferably spaced at different distances from the back of the casing so that the connecting links do not interfere with one another even though their directions may cross. Accordingly when designing the instrument it has been necessary in the past to predetermine the position of each measuring element in the casing and particularly with regard to the spacing of the connecting arm of each measuring element from the back of the casing so that it has the same spacing as that of the pen arm lever to which it is connected. If one of the unit assemblies in such an instrument has to be replaced, the measuring element has to be selected in accordance with the spacing of its connecting arm from the back of the casing.

In the present invention this problem has been simplified by providing a standardized measuring element and connecting arm which is easily adjustable when mounted within the casing to position its connecting arm in correspondence with its respective pen arm lever.

Referring to Figures 4 through 8 wherein is illustrated a standardized measuring element assembly in accordance with the invention, reference character 20 designates generally a supporting bracket for the element assembly, having a foot 21 apertured at 22 to receive a screw (not shown) for securing the bracket to the back of the case 15, the foot having a depending pin 22a seating in a hole sunk in the case back, whereby to position properly the bracket with reference to the case. The end portion of the foot 21 is provided with a mounting hole in which is received the inner reduced end 23 of the element arbor 24, the outer reduced end 25 of which is received in a mounting hole provided in an outer bar 26 extending parallel to the bracket foot and fixed to the bracket outer arm 27 by cap screws 28.

The pressure sensitive element of the assembly includes a helical pressure spring 30 of tubular construction, the inner end of which is suitably connected to the bracket and the outer free end to the arbor 24 by a flexible connection strip 31 in such manner as to provide a fixed axis of rotation of the pressure spring. Preferably a mechanical connection is provided between the outer end of the connection strip 31 and the free end of the pressure spring, but a welded connection may be utilized when the connection is made beyond the calibrated portion of the pressure spring.

For connecting the inner end of the pressure spring 30 to the bracket support 20, a clamp plate 35 is provided, the plate-like body portion being provided with an elongated aperture 36, and with an arcuate slot 37 extending on a radius struck from the center of the aperture 36. A head screw 38 extends through aperture 36 and is threaded into the bracket foot 21, and a head screw 39 similarly passes through the arcuate slot 37 and is threaded into the foot 21. The arcuate slot 37 and screw 39 permit adjustment of the clamp plate 35 about the arbor 24 whereby the pressure spring 30, being secured to the clamp plate as will be described, may be turned generally about its axis of rotation. The elongated aperture 36 and screw 38 provide for a factory adjustment of the clamp plate 35 laterally of the bracket foot to compensate for manufacturing tolerances in bringing into coincidence the axis of the pressure spring with relation to its fixed axis of rotation.

One side of the clamp plate 35 terminates in upstanding ribs 40 and 41, the rib 41 extending in parallel forwardly advanced relation with reference to the rib 40 and being connected with the clamp plate through a downwardly sloped portion 42. The relatively inner face of the rib 41 provides a surface against which the inner end of the pressure spring is clamped, the outer and inner edges of the rib 41 being suitably notched to receive a clamping clip 42a extending around an inner end portion of the spring, the ends of the clamping clip being secured by a screw 43 as more clearly indicated in Figure 8. By reference to Figure 5 the relatively forward end of the rib 41 is curved outwardly as at 41a for ease in assembling the pressure spring with the clamp plate 35.

The capillary tubing 13 through which variations in pressure are transmitted from the measuring bulb 8 to the interior of the pressure spring 30 is secured as by welding to the inner end of the pressure spring as indicated at 44, and, through the provision of an enlarged connector 45 welded or otherwise secured to the side rib 40 of the clamp plate, the capillary adjacent its point of securement with the pressure spring is also fixedly secured to the clamp plate. Accordingly, the connection between the capillary and the pressure spring is protected from undue bending or other strains as would tend to injure it.

With the element assembly so far described, it will be seen that variations in pressure within the tubular pressure spring 30 result in winding or unwinding movement of the helix which motion is translated by the connection strip 31 into rotary movement of arbor 24.

This rotary movement is transmitted through suitable linkage mechanism to the pen arm lever 15 operated by the pressure element. Inasmuch as the various pen arm levers are spaced different distances from the back of casing 15, the connection links between the various pressure elements and their respective pen arm levers must also be spaced at different and corresponding distances from the back of the instrument casing so as not to interfere with one another.

In the present invention this is accomplished by providing each pressure responsive element with a lever arm having a connecting leg which is adjustable with respect to its spacing from the back of the casing. To this end each pressure responsive element is provided with a connecting lever bracket comprising a leg 50 secured with respect to the arbor 24 and terminating in a leg 51 perpendicular to the back of the instrument casing. The curved connection between the two legs is preferably ribbed to strengthen it.

The end of bracket leg 50 that is secured to the arbor 24 is enlarged as at 52 (Figure 7) and is provided with an aperture through which the outer end of the arbor 24 extends. A shouldered bushing 53 is fixedly secured as by soldering to the arbor 24 and arranged on the arbor is a loose collar 55 which is provided with a central aperture of lesser diameter than that of the shoulder 56 of bushing 53, and with opposed threaded screw openings. As illustrated in Figure 7, collar 55 is adapted to be positioned against the shoulder 56, whereupon securing screws 57 passing through suitable apertures in the circular leg end 52 are threaded into collar 55, thus to clamp the shoulder 56 therebetween. Accordingly, rotary movement of the arbor is transmitted to bracket legs 50 and 51. Loosening of screws 57 permits adjustment of the angular relationship of the arbor and bracket and hence of the arbor and element lever.

The bracket leg 51 extends substantially the full length of the pressure spring element and is provided with an elongated slot 60. A lever arm generally designated 61 perpendicular to the leg 51 is operatively related to the bracket leg 50 in such manner that its position with respect to the leg 51 may be varied at will and at this end the lever is provided with an extension 62 terminating in an end portion which is U-shaped as shown in Figure 4, the cross part 63 thereof being preferably circular in formation and of substantially greater diameter than the width of the slot 60. The cross part 63 is disposed rearwardly of and against the rear face of the bracket leg 51, with the side portions 64 and 65 extending relatively forwardly through the slot 60 being so proportioned in width as to engage against side edges of the slot, thus to eliminate side play.

As illustrated in Figures 4 and 6, adjusting screw 66 having a circular head of diameter greater than the width of the slot 60 extends through the slot and is threaded into the circular cross piece 63. Thus, by loosening screw 66, the lever assembly may be moved bodily with respect to the leg 51 and its spacing with respect to the back of the casing may be adjusted.

The other end of the lever arm 61 is provided with an upstanding extension 68 and secured between the extensions 62, 68 is an elongated threaded shaft 69 disposed parallel to the lever arm 61. Threaded on the shaft 69 so as to be adjustable along its length is a nut 70 whose outer surface is serrated to provide notches to facilitate turning it, as with a screw driver, the nut actuating a clip member 72 having upstanding jaws 73 which engage against the side of the nut 70. The jaws 73, as indicated in Figure 6, are each provided with a recess 74 through which lever arm 61 extends, the jaws carrying an arm 75 extending laterally in both sides of lever arm 61. The ends of the arm 75 are provided with holes 76a and 76b through either of which may be secured the end of a link, such as 12a (Figure 1) connecting the arm with the pen arm lever, whereby to transmit rotary movement of arbor 24 to the latter.

By the above described arrangement, not only the spacing of the lever arm 61 from the back of the casing may be adjusted to correspond with the required spacing of the connecting link as required by the corresponding spacing of the pan arm lever, but also the effective length of the lever arm 61 may be adjusted. Further, the provision of the lever arm 75 with link connecting openings 76a and 76b permits either a left or right hand connection between the element lever arm 61 and the pen arm lever. Accordingly the measuring element assembly as described is universally adapted for mounting in any position within the instrument casing, regardless of the spacing of the link which connects its lever arm 61 with the pen arm lever, and is further sufficiently flexible as to provide for adjustment in the effective length of the lever.

In Figures 9 and 10, there is illustrated a modified form of connection between the element arbor and bracket leg, in which reference character 24a designates an arbor. The bracket leg 50a has a circular end portion apertured for the passage of the arbor therethrough, the end portion having riveted thereto or otherwise carried thereby a split clamping collar 50b. The collar is cut away to provide a bearing surface 50c against which engages the head of a clamping screw 50d. Tightening of the screw causes the collar to clamp the arbor, with the result that movement of the arbor is transmitted to the bracket leg 50a. The angular relationship of the arbor and the bracket leg may also be adjusted through this form of connection.

It is desirable that the construction of the casing permit the assembly of the measuring element, capillary tubing, protective tubing and responsive element in a substantially permanent relationship independently of the instrument casing and to be mounted in the instrument casing after such assembly. One of the advantages of such a construction is that if one of the responsive units becomes damaged or needs to be changed for any other reason while in service, the particular unit may be removed from the instrument casing without disturbing the other responsive units and be replaced or repaired as desired, all without the need of returning the instrument casing to the factory. So, too, with such an arrangement the instrument or part of the instrument may be converted from one type of service into another type in the field without the necessity of returning the entire instrument to the factory.

As many changes could be made in carrying out the above constructions without departing from the scope of the invention, it is intended that all matter contained in the above description or shown in the accompanying drawigs shall be interpreted as illustrative and not in a limiting sense.

I claim:

1. In a measuring element assembly, a bracket having a foot portion, an arbor journaled for rotation in said bracket, a helical pressure spring disposed about the arbor, a clamp plate carried by said bracket foot, means securing one end of the spring to the clamp plate, means connecting the other end of the spring to the arbor, and means for effecting transverse linear adjustment of the clamp plate with reference to the foot whereby to align the axes of the spring and the arbor.

2. In a measuring element assembly, a bracket having a foot portion, an arbor journaled for rotation in said bracket, a helical pressure spring disposed about the arbor, a clamp plate carried by said bracket foot, means securing one end of the spring to the clamp plate, means connecting the other end of the spring to the arbor, and means for adjusting the plate angularly and linearly with reference to the foot whereby to orient the spring about the axis of the arbor.

3. A measuring element assembly wherein a helical pressure spring and an arbor connected thereto are mounted on a bracket, said assembly being characterized in that a clamp plate adjustably mounted on said bracket has means for securing said spring in adjustable relation to said bracket and said arbor, and means are provided for defining and limiting adjusting movement of said plate includig a portion having a straight slot and a curved slot, and means cooperating with said slots for releasably securing the clamp plate to the bracket.

4. A measuring element assembly wherein a helical pressure spring and an arbor connected thereto are mouted on a bracket, said assembly being characterized in that a clamp plate adjustably mounted on said bracket has means for securing said spring in adjustable relation to said bracket and said arbor including a rib having a notch, and a clamping device having a portion seated in said notch and engaging a portion of said spring to secure the latter to said clamp plate.

5. In a measuring element assembly, the combination of a pressure spring, an arbor operatively connected to and rotated by said spring, a pen arm, and adjustable means for actuating said pen arm in response to variations in said pressure spring including a bracket mounted on said arbor, a lever arm slidably mounted on a portion of said bracket, means for releasably securing said lever arm thereon, a link operatively interposed between said lever arm and said pen arm and means connecting one end of said link to said lever arm including a support for said link end and means for adjusting the position of said link end in relation to said support.

CLAUDE D. YOUNG.